(12) United States Patent
Tokuma et al.

(10) Patent No.: US 7,039,992 B2
(45) Date of Patent: May 9, 2006

(54) LATHE

(75) Inventors: Tsutomu Tokuma, Yamatokoriyama (JP); Yoshinori Sakashita, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 106 days.

(21) Appl. No.: 10/885,034

(22) Filed: Jul. 7, 2004

(65) Prior Publication Data

US 2005/0022350 A1 Feb. 3, 2005

(30) Foreign Application Priority Data

Jul. 9, 2003 (JP) .............................. 2003-194646

(51) Int. Cl.
  B23P 23/02 (2006.01)
  B23B 19/02 (2006.01)
  B23B 17/00 (2006.01)
  B23B 3/18 (2006.01)

(52) U.S. Cl. .......................... 29/27 C; 82/121; 82/129; 82/142; 82/147; 82/162; 82/165; 82/149

(58) Field of Classification Search ................ 29/27 C, 29/27 R; 82/142, 147, 157, 162, 165, 129, 82/117, 131, 120–121, 138, 149, 159, 900; 409/165, 231
See application file for complete search history.

(56) References Cited

U.S. PATENT DOCUMENTS

| | | | | |
|---|---|---|---|---|
| 3,486,209 A | * | 12/1969 | Shultz et al. ................ 29/27 R |
| 4,828,437 A | * | 5/1989 | Mukherjee et al. ............ 82/147 |
| 5,127,140 A | * | 7/1992 | Oiwa et al. .................. 29/27 C |
| 5,490,307 A | * | 2/1996 | Link ........................... 29/27 C |
| 5,704,262 A | * | 1/1998 | Baumbusch et al. ........... 82/129 |
| 6,370,994 B1 | * | 4/2002 | Nakaminami et al. ......... 82/149 |
| 6,609,448 B1 | * | 8/2003 | Nakaminami et al. ......... 82/142 |
| 6,697,700 B1 | * | 2/2004 | Nakaminami et al. ....... 700/194 |
| 6,877,407 B1 | * | 4/2005 | Nakaminami et al. ......... 82/142 |
| 2004/0194269 A1 | * | 10/2004 | Geissler et al. .............. 29/27 C |

FOREIGN PATENT DOCUMENTS

| | | | |
|---|---|---|---|
| JP | 2000-126953 A | * | 5/2000 |
| JP | 2002-59301 | | 2/2002 |
| RU | 2064371 C1 | * | 7/1996 |

* cited by examiner

Primary Examiner—Erica Cadugan
(74) Attorney, Agent, or Firm—Westerman, Hattori, Daniels & Adrian, LLP

(57) ABSTRACT

A lathe 1 comprises a bed 5, a headstock 10 having a housing 13 and a support base 14, a main spindle 11, a first tool rest 44, and a second tool rest 50. The support base 14 is formed so as to have a concave portion 14a on the upper portion thereof and so that the upper portion protrudes toward the second tool rest 50. The tool rest body 51 of the second tool rest 50 is configured so as to be movable into and out of a space formed downward from the upper portion of the support base 14. The housing 13 has a holding hole 13a for rotatably holding the main spindle 11, and installation portions 13b. The installation portions 13b are supported on the support base 14 in a state wherein a predetermined clearance is provided between the housing 13 and the concave portion 14a.

4 Claims, 6 Drawing Sheets

LATHE

BACKGROUND OF THE INVENTION

1. Field of the Invention

The present invention relates to a lathe comprising a headstock for rotatably supporting a main spindle for holding a workpiece, and first and second tool rests for holding tools, the first and second tool rests being movable in predetermined feed directions.

2. Description of the Prior Art

Conventionally, a machine tool having a structure shown in FIGS. 5 and 6 is known as a lathe. This lathe 100 comprises a bed 101 formed in the shape of a triangular prism becoming broad toward the bottom, and a first headstock 102, a second headstock 105, a first tool rest 110, a second tool rest 115 and the like provided on the bed 101 as shown in FIGS. 5 and 6 (refer to Japanese Unexamined Patent Publication No. 2002-59301).

The first and second headstocks 102 and 105 rotatably support main spindles 103 and 106 around the axes thereof, respectively, and are provided with rotation drive devices (not shown) for rotating the main spindles 103 and 106 around the axes thereof. The first and second headstocks 102 and 105 are mounted on the inclined face on the front side of the bed 101. In addition, the second headstock 105 is configured so as to move in the arrow-indicated Z-axis direction under the guidance of first guide rails 108 provided on the inclined face on the front side of the bed 101 in parallel with the axis lines of the main spindles 103 and 106. Furthermore, the main spindles 103 and 106 are provided with chucks 104 and 107 for holding workpieces.

The first tool rest 110 is provided between the first headstock 102 and the second headstock 105 and comprises a saddle 111 configured so as to move in the arrow-indicated Z-axis direction under the guidance of the first guide rails 108, and a tool rest body 112, configured so as to move in the arrow-indicated X-axis direction under the guidance of guide rails (not shown) provided on the saddle 111 orthogonally to the axis lines of the main spindles 103 and 106, for holding tools T.

The second tool rest 115 comprises a saddle 116 configured so as to move in the arrow-indicated Z-axis direction under the guidance of second guide rails 109 provided on the inclined face on the rear side of the bed 101 in parallel with the axis lines of the main spindles 103 and 106, a column 117 configured so as to move in the arrow-indicated Y-axis direction under the guidance of guide rails (not shown) provided on the saddle 116 orthogonally to the axis lines of the main spindles 103 and 106, a support base 118 configured so as to move in the arrow-indicated X-axis direction under the guidance of guide rails (not shown) provided on the column 117 orthogonally to both of the Z-axis and the Y-axis, a tool rest body 119, rotatably supported by the support base 118 in the arrow-indicated B-axis direction around a predetermined rotation center axis and configured so that indexing is made possible at a predetermined rotation angle position in the B-axis direction, for rotatably holding a tool T, and a drive motor 120, provided on the tool rest body 119, for rotating the tool T.

In this lathe 100, a workpiece held in the chuck 104 of the first headstock 102 or in the chuck 107 of the second headstock 105 is rotated together with the main spindle 103 or 106 by the rotation drive device (not shown). Furthermore, the first tool rest 110 or the second tool rest 115 in which the tool T is held is moved in a predetermined feed direction. Hence, a relative motion is carried out between the rotating workpiece and the tool T, whereby the workpiece is machined into a predetermined shape.

Machining is carried out in a state wherein the tool T of the second tool rest 115 has been fixed and held, in a state wherein the tool T has been rotated by the drive motor 120 or in a state wherein the tool T has been indexed at a predetermined rotation angle position by the rotation of the tool rest body 119 in the B-axis direction in accordance with machining requirements.

However, in the above-mentioned conventional lathe 100, the first headstock 102 and the second headstock 105 are integrally connected to the main spindles 103 and 106 and the rotation drive devices (not shown). Hence, for example, heat generated at bearings or the like for supporting the main spindles 103 and 106 is transferred to the various portions of the first and second headstocks 102 and 105 and the main spindles 103 and 106, whereby these are deformed thermally. As a result, an error occurs in the relative positional relationship between the workpiece held in the main spindle 103 and the tool T held in the first tool rest 110, and similarly an error occurs in the relative positional relationship between the workpiece held in the main spindle 106 and the tool T held in the second tool rest 115, whereby there is a problem of reducing the accuracy of machining.

In addition, for example, in the case when workpieces held in the chucks 104 and 107 are machined into a rectangular shape, a method shown in FIG. 7 is generally used. In other words, the tool T held in the tool rest body 119 is indexed at a predetermined angle position in the B-axis direction so that the axis line thereof is parallel with the axis lines of the main spindles 103 and 106 as shown in FIG. 7. Then, the tool T is moved in the Y-axis direction as shown in FIG. 7(*a*) to machine the workpiece W so as to obtain one side of the rectangular shape. Next, the workpiece W is rotated at 90-degree intervals as shown in FIG. 7 (*b*), (*c*) and (*d*) so as to be indexed, and the tool T is moved similarly in the Y-axis direction to machine the workpiece W so as to obtain the other sides of the rectangular shape.

However, conventionally, the accuracy of indexing the workpiece W is not always sufficiently high. Hence, the above-mentioned method has a problem wherein the squareness between the sides constituting the rectangular shape is not obtained at high accuracy.

In a general lathe, the orthogonal accuracy among the feed axes of the first tool rest 110 and the second tool rest 115 is usually set higher than the rotary indexing accuracy of the main spindles 103 and 106. Hence, in the case when the above-mentioned rectangular shape is obtained by machining, the squareness between the sides obtained by using a method wherein the tool T is moved along each side of the rectangular shape as shown in FIG. 8 can be made higher than the squareness between the sides obtained by using the above-mentioned method wherein the workpiece W is indexed at 90-degree intervals.

However, in the above-mentioned conventional lathe, the movement amount of the second tool rest 115 in the X-axis direction is limited by a certain amount because of the relationship with the first tool rest 100. Hence, the tool T cannot be moved beyond the axis lines of the main spindles 103 and 106 to the opposite side by a sufficient margin. Therefore, the machining method shown in FIG. 8 cannot be used. As a result, only the machining method shown in FIG. 7 can be used for the conventional lathe, whereby the above-mentioned problem cannot be solved.

In view of the above-mentioned circumstances, an object of the present invention is to provide a lathe capable of machining workpieces at high accuracy.

SUMMARY OF THE INVENTION

In order to attain the above-mentioned object, a lathe in accordance with the present invention comprises at least:

a bed formed so that the front face thereof is vertical; a headstock provided on the bed; a main spindle provided horizontally so that the axis line thereof is parallel with the front face of the bed and supported by the headstock so as to be rotatable around the axis line thereof; a rotation drive device for rotating the main spindle around the axis line thereof; a first tool rest provided on the upper face of the bed so as to be movable in orthogonal three-axes directions, that is, the direction of a first axis along the axis line of the main spindle, the direction of a second axis along the vertical direction and the direction of a third axis orthogonal to both of the first axis and the second axis; and a second tool rest provided on the front face of the bed so as to be movable in orthogonal two-axes directions, that is, the direction of the first axis and the direction of the second axis, comprising a tool rest body supported on the front face of the bed so as to be movable in the orthogonal two-axes directions, a turret supported on a face of the tool rest body, opposite to the side thereof on the side of the headstock in the first-axis direction, so as to be rotatable around the rotation center axis thereof that is parallel with the first axis, and a rotary indexing device for rotating the turret around the rotation center axis thereof and for indexing the turret at a predetermined rotation angle position, the first tool rest being provided above the axis line of the main spindle and configured so as to approach the axis line of the main spindle from above and move away therefrom upward, and the second tool rest being provided below the axis line of the main spindle and configured so as to approach the axis line of the main spindle from below and move away therefrom downward, wherein the headstock comprises a housing, having a holding hole, for holding at least the main spindle and the rotation drive device in the holding hole, and a support base, fixed to the bed, for supporting the housing, the support base has a concave portion on the upper portion thereof, which opens in the upper face and in both end faces in the first-axis direction, the upper portion of the support base protrudes toward the second tool rest in the first-axis direction, and a predetermined space is formed downward therefrom, the housing has installation portions protruding to both sides of the outer circumferential face thereof in the third-axis direction, the lower faces of which are positioned in a horizontal plane including the axis line of the main spindle, and the housing is supported on the support base in a state wherein the lower faces of the installation portions make contact with the upper face of the support base and a predetermined clearance is provided between the outer circumferential face thereof and the inner circumferential face of the concave portion, and at least the tool rest body of the second tool rest is configured so as to be movable into and out of the space formed downward from the upper portion of the support base.

In accordance with the present invention, when the first tool rest or the second tool rest is moved appropriately in a predetermined direction in a state wherein the main spindle of the headstock is rotated around the axis thereof by the rotation drive device and a workpiece held in the main spindle is rotated, a relative motion is carried out between the rotating workpiece and the tool held on the first tool rest or the second tool rest, whereby the workpiece is machined into a predetermined shape.

Furthermore, in the lathe in accordance with the present invention, the housing is supported by the support base in a state wherein a predetermined clearance is provided between the outer circumferential face of the housing and the inner circumferential face of the concave portion of the support base. Hence, even if heat generated at bearings or the like for supporting the main spindle is transferred to the various portions of the housing, the housing can freely expand without any restriction. In addition, the lower faces of the installation portions of the housing, installed on the upper face of the support base, and the axis line of the main spindle are in the same horizontal plane. Hence, even if the housing expands thermally, the position of the axis line is not changed, whereby the position is made unchangeable.

Hence, any displacement in the relative positional relationship between the workpiece held in the main spindle and the tool held in the tool rest can be prevented, whereby the workpiece can be machined at high accuracy.

In the second tool rest, as described above, the turret is provided on the face of the tool rest body, opposite to the side thereof on the side of the headstock in the first-axis direction. This configuration is used because another headstock (second headstock) may be provided on the front face of the bed so as to be opposed to the headstock (first headstock) and so that the second tool rest is placed between the first headstock and the second headstock, depending on the model of lathe and the like.

In other words, if the turret is provided on the tool rest body on the side of the first headstock in the case when the second tool rest is provided, the tip portion of the main spindle rotatably supported by the second headstock is required to protrude from the second headstock to the turret. In this configuration, the supporting rigidity of the main spindle by the second headstock is reduced, and machining accuracy is lowered.

On the other hand, if the turret is provided on the tool rest body on the side of the second headstock, this causes a problem wherein the tip portion of the main spindle of the first headstock is required to similarly protrude from the first headstock.

In the lathe in accordance with the present invention, the support base of the headstock (the first headstock) is formed so that the upper portion thereof protrudes toward the second tool rest in the first-axis direction, and configured so that at least the tool rest body of the second tool rest can move into and out of the space formed downward from the upper portion of the support base. Hence, the turret can move closer to the main spindle, whereby it is possible to reduce the amount of the protrusion of the main spindle from the housing and the amount of the protrusion of the housing from the support base. Hence, the holding rigidity of the main spindle by the housing and the supporting rigidity of the housing by the support base can be set at appropriately required levels, whereby the workpiece can be machined at high accuracy.

The headstock may be configured so as to be further provided with spacers for adjusting the position of the axis line of the main spindle in the second-axis direction and so that the lower faces of the installation portions of the housing are placed on the upper face of the support base via the spacers.

With this configuration, the position of the axis line of the main spindle in the second-axis direction can be raised upward by the spacers. Hence, even if the first tool rest cannot be moved downward from above beyond the axis line of the main spindle because of the structure of the lathe, the first tool rest can be moved downward relatively with respect to the axis line of the main spindle by the amount corresponding to the amount of the axis line of the main spindle raised by the spacers.

Hence, for example, in the case when a workpiece is machined into a rectangular shape, the workpiece can be machined into the rectangular shape at high accuracy by moving the first tool rest along straight movement axes, without rotating and indexing the main spindle at predetermined rotation angle positions.

In addition, the headstock may be provided with heat insulating materials held between the lower faces of the installation portions of the housing and the upper face of the support base. In the case when the spacers are provided, the heat insulating materials are held between the lower faces of the installation portions of the housing and the spacers, or between the upper face of the support base and the spacers.

With this configuration, the heat insulating materials prevent heat transfer from the housing to the support base, whereby any thermal displacement of the support base can be restrained. Therefore, any displacement of the position of the main spindle owing to the thermal displacement of the support base can be prevented, whereby workpieces can be machined at high accuracy.

DESCRIPTION OF THE PREFERRED EMBODIMENTS

Figure 1:
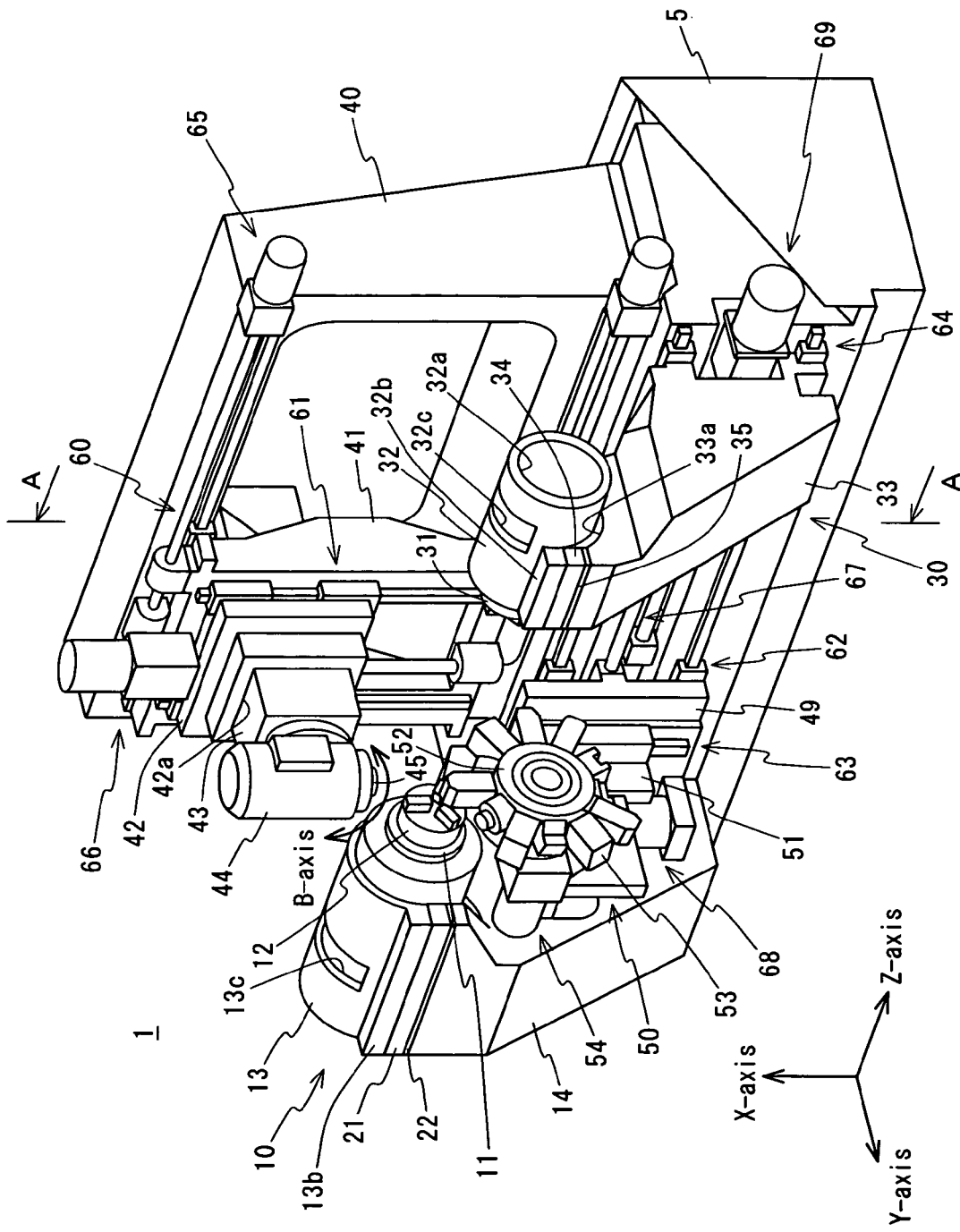
FIG. 1 is a perspective view showing a schematic configuration of an NC lathe in accordance with an embodiment of the present invention.
Figure 2:
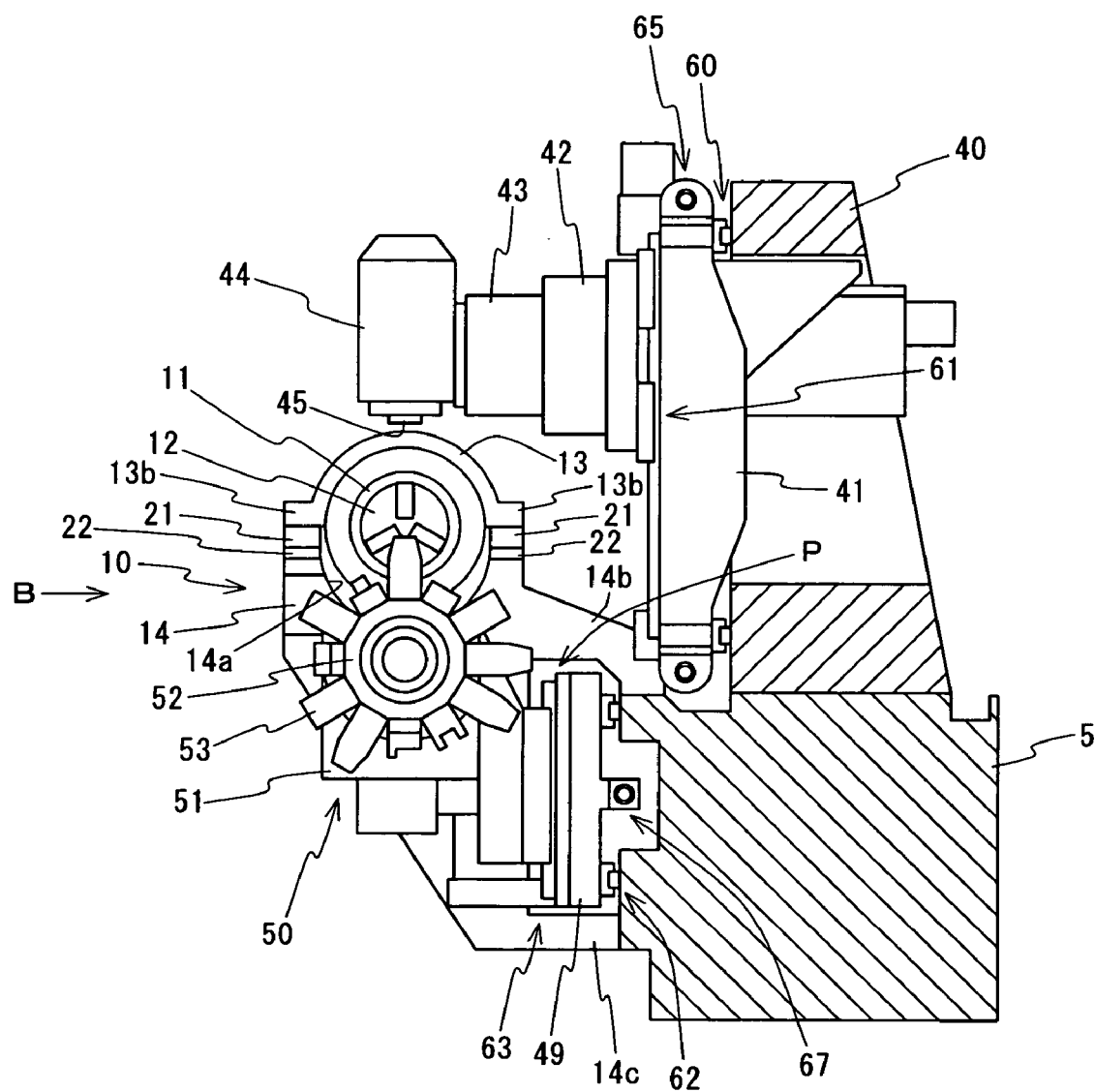
FIG. 2 is a cross-sectional view taken in the arrow-indicated A—A direction of FIG. 1.
Figure 3:
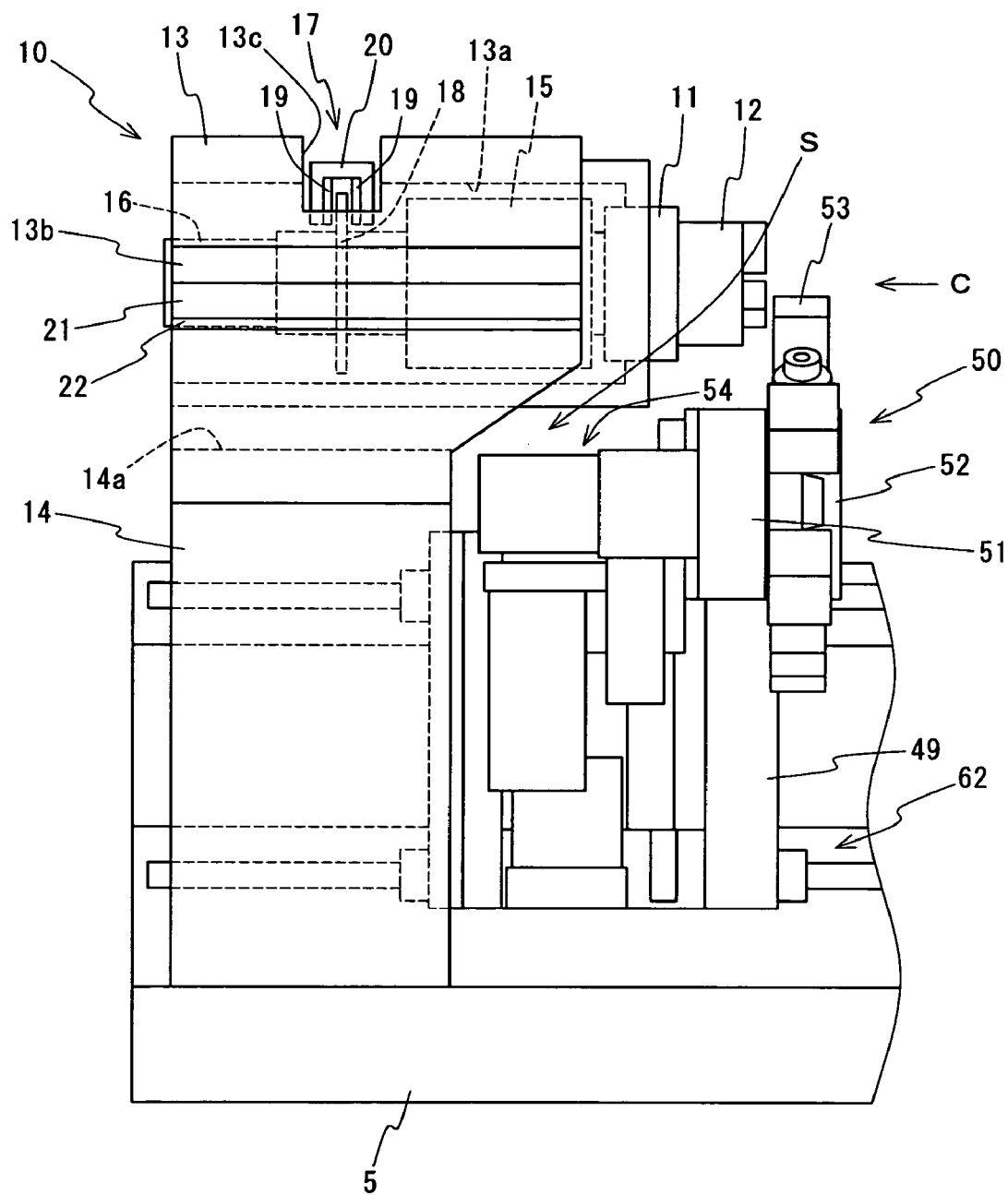
FIG. 3 is a front view taken in the arrow-indicated B direction of FIG. 2.
Figure 4:
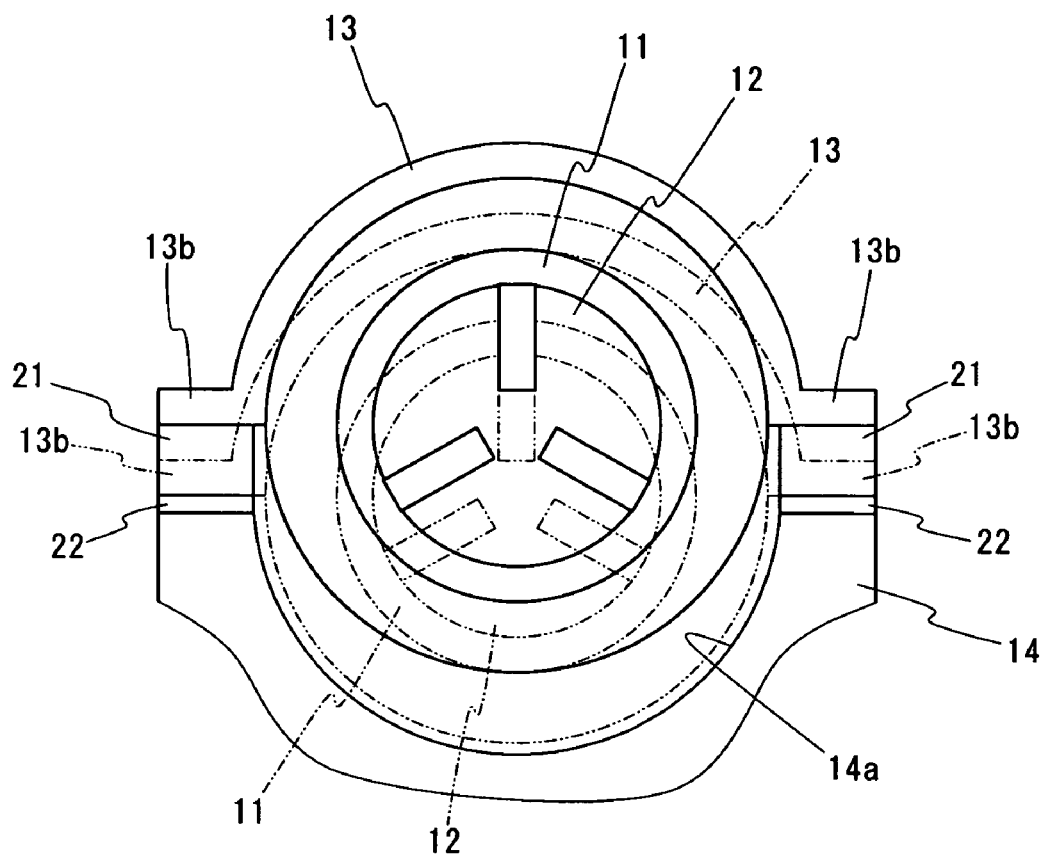
FIG. 4 is a side view taken in the arrow-indicated C direction of FIG. 3.
Figure 5:
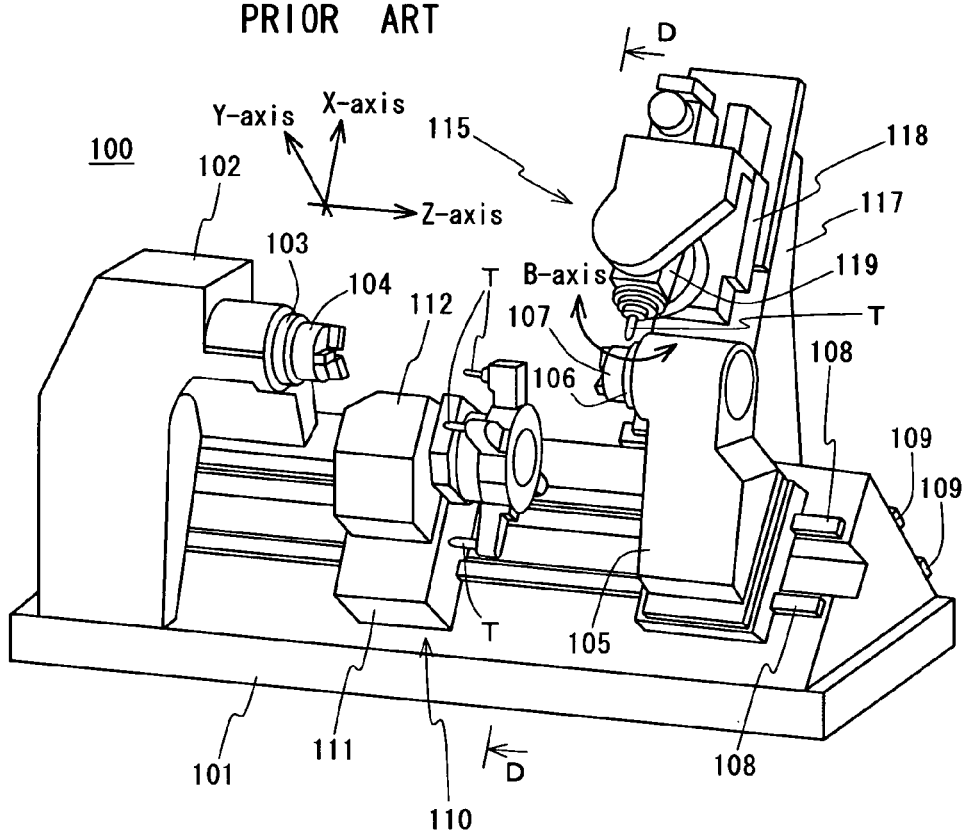
FIG. 5 is a perspective view showing a schematic configuration of the NC lathe in accordance with the conventional example.
Figure 6:
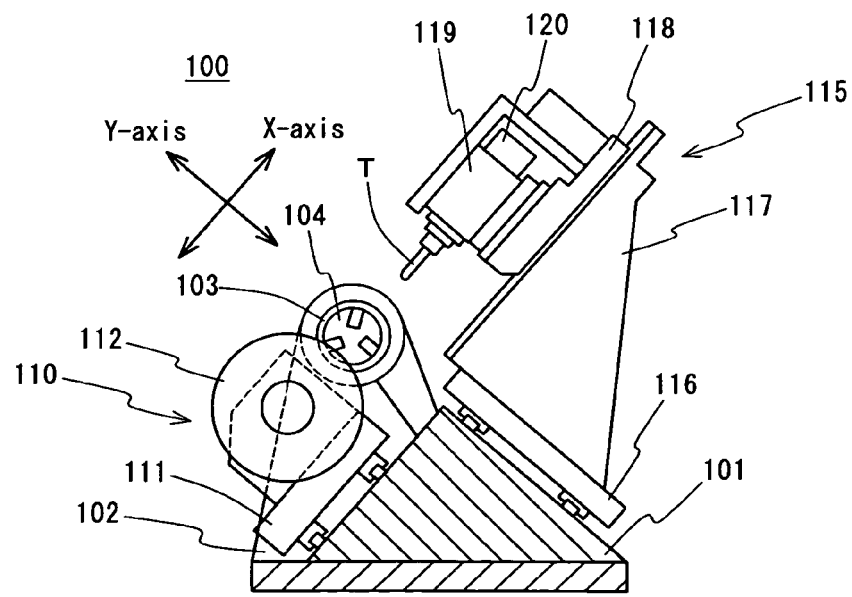
FIG. 6 is a cross-sectional view taken in the arrow-indicated D—D direction of FIG. 5.
Figure 7:
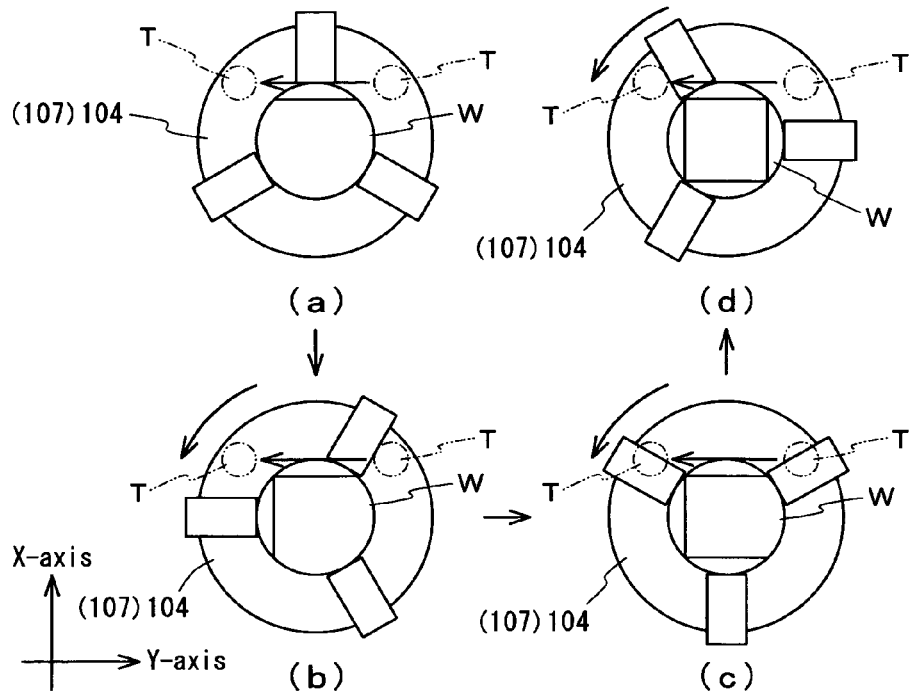
FIG. 7 is an explanatory view for explaining a workpiece machining method.

A preferred embodiment of the present invention will be described below with reference to the accompanying drawings. FIG. 1 is a perspective view showing a schematic configuration of an NC lathe in accordance with an embodiment of the present invention. FIG. 2 is a cross-sectional view taken in the arrow-indicated A—A direction of FIG. 1. FIG. 3 is a front view taken in the arrow-indicated B direction of FIG. 2. FIG. 4 is a side view taken in the arrow-indicated C direction of FIG. 3.

As shown in FIGS. 1 to 4, the NC lathe 1 in accordance with this embodiment comprises a bed 5 formed in a rectangular shape in the cross-section thereof so that the upper face is horizontal and so that the front face is vertical, a first headstock 10 fixed to the bed 5, a first main spindle 11 provided horizontally so that the axis line thereof is parallel with the front face of the bed 5 and supported by the first headstock 10 so as to be rotatable around the axis line thereof, a stationary frame 40 formed in a rectangular frame shape and fixed to the upper face of the bed 5 so that the horizontal sides thereof are parallel with the axis line of the first main spindle 11 and so that the vertical sides thereof are in the vertical direction, a movable frame 41 formed similarly in a rectangular frame shape so that the horizontal and vertical sides thereof are parallel with the horizontal and vertical sides of the stationary frame 40, respectively, and provided so as to be movable in the Z-axis (first-axis) direction along the horizontal sides of the stationary frame 40, a first saddle 42 provided so as to be movable in the X-axis (second-axis) direction along the vertical sides of the movable frame 41 and having an accommodation hole 42a passing through in the Y-axis (third-axis) direction orthogonal to both the Z-axis and the X-axis, a quill 43 accommodated inside the accommodation hole 42a in the first saddle 42 and provided so as to be movable in the Y-axis direction, and a first tool rest 44 supported on the front end face of the quill 43.

The NC lathe 1 further comprises a second headstock 30 provided on the front face of the bed 5 so as to be opposed to the first headstock 10 and movable in the Z-axis direction, a second main spindle (not shown) supported by the second headstock 30 so as to be rotatable around the axis thereof and coaxial with the axis line of the first main spindle 11, a second saddle 49 provided on the front face of the bed 5 between the first headstock 10 and the second headstock 30 so as to be movable in the Z-axis direction, and a second tool rest 50 provided on the second saddle 49 so as to be movable in the X-axis direction.

Furthermore, the NC lathe 1 comprises a first guide device 60 for guiding the movement of the movable frame 41 along the Z-axis, a second guide device 61 for guiding the movement of the first saddle 42 along the X-axis, a third guide device (not shown) for guiding the movement of the quill 43 along the Y-axis, a fourth guide device 62 for guiding the movement of the second saddle 49 along the Z-axis, a fifth guide device 63 for guiding the movement of the second tool rest 50 along the X-axis, a sixth guide device 64 for guiding the movement of the second headstock 30 along the Z-axis, a first feed device 65 for moving the movable frame 41 in the Z-axis direction, a second feed device 66 for moving the first saddle 42 in the X-axis direction, a third feed device (not shown) for moving the quill 43 in the Y-axis direction, a fourth feed device 67 for moving the second saddle 49 in the Z-axis direction, a fifth feed device 68 for moving the second tool rest 50 in the X-axis direction, a sixth feed device 69 for moving the second headstock 30 in the Z-axis direction, and a control device (not shown) for controlling the operations of the first feed device 65, the second feed device 66, the third feed device (not shown), the fourth feed device 67, the fifth feed device 68 and the sixth feed device 69.

A first chuck 12 for holding a workpiece (not shown) is installed on the front end face of the first main spindle 11. The first headstock 10 comprises a first housing 13 for holding the first main spindle 11 and the like, a first support base 14, fixed to the bed 5, for supporting the first housing 13, and the like.

The first support base 14 has a concave portion 14a on the upper portion thereof, which opens in the upper face and in both end faces in the Z-axis direction. The upper portion protrudes toward the second tool rest 50 in the Z-axis direction, and a predetermined space is formed downward therefrom.

In addition, the first support base 14 has a first support portion 14b installed on the upper face of the bed 5 and a second support portion 14c installed on the front face side of the bed 5. By using the first support portion 14b and the second support portion 14c, the first support base 14 is fixed to the bed 5 so as to be positioned on the front face of the bed 5. A predetermined space P passing through in the Z-axis direction is formed between the first support portion 14b and the second support portion 14c. The second saddle 49 can move into and out of the space P.

The first housing 13 has a holding hole 13a passing through in the Z-axis direction and installation portions 13b protruding to both sides of the outer circumferential face in the Y-axis direction. Inside the holding hole 13a, the first main spindle 11 is rotatably held, and a first drive motor 15 for rotating the first main spindle 11 around the axis line thereof is also held. In addition, a first chuck cylinder 16, provided on the rear end face of the first main spindle 11, for operating the first chuck 12 is accommodated inside the holding hole 13a.

Furthermore, the first housing 13 is formed so that the lower faces of the installation portions 13b are positioned in a horizontal plane including the axis line of the first main spindle 11. Moreover, the first housing 13 is supported on the first support base 14 in a state wherein the lower faces of the installation portions 13b make contact with the upper face of the first support base 14 and a predetermined clearance is provided between the outer circumferential face thereof and the inner circumferential face of the concave portion 14a.

Still further, the first housing 13 has an opening portion 13c that opens in the outer circumferential upper face thereof and in the inner circumferential face of the holding hole 13a. A first brake device 17 is provided in the opening portion 13c. This first brake device 17 comprises a brake disc 18 provided on the rear end side of the first main spindle 11, and a drive mechanism 20 for holding and pressing the brake pads 19 against both faces of the brake disc 18. The first brake device 17 can be maintained from the opening portion 13c.

Still further, first spacers 21 for adjusting the position of the axis line of the first main spindle 11 in the X-axis direction and first heat insulating materials 22 are held between the lower faces of the installation portions 13b of the first housing 13 and the upper face of the first support base 14. The first heat insulating materials 22 are placed on the upper face of the first support base 14, the first spacers 21 are placed on the upper faces of the first heat insulating materials 22, and the installation portions 13b of the first housing 13 are placed on the upper faces of the first spacers 21.

Similarly, a second chuck 31 for holding a workpiece (not shown) is installed on the front end face of the second main spindle (not shown). The second tool rest 30 comprises a second housing 32 for holding the second main spindle (not shown) and the like, and a second support base 33, provided on the front face of the bed 5 so as to be movable in the Z-axis direction, for supporting the second housing 32.

The second support base 33 has a concave portion 33a on the upper portion thereof, which opens in the upper face and in both end faces, in the Z-axis direction. The second housing 32 has a holding hole 32a passing through in the Z-axis direction and installation portions 32b protruding to both sides of the outer circumferential face in the Y-axis direction. Inside the holding hole 32a, the second main spindle (not shown) is rotatably held, and a second drive motor (not shown) for rotating the second main spindle (not shown) around the axis line thereof is also held. In addition, a second chuck cylinder (not shown), provided on the rear end face of the second main spindle (not shown), for operating the second chuck 31 is accommodated inside the holding hole 32a.

Furthermore, the second housing 32 is formed so that the lower faces of the installation portions 32b are positioned in a horizontal plane including the axis line of the second main spindle (not shown). Moreover, the second housing 32 is supported on the second support base 33 in a state wherein the lower faces of the installation portions 32b make contact with the upper face of the second support base 33 and a predetermined clearance is provided between the outer circumferential face thereof and the inner circumferential face of the concave portion 33a.

Still further, the second housing 32 has an opening portion 32c that opens in the outer circumferential upper face thereof and in the inner circumferential face of the holding hole 32a. A second brake device (not shown) is provided in the opening portion 32c. This second brake device (not shown) comprises a brake disc (not shown) provided on the rear end side of the second main spindle (not shown), and a drive mechanism (not shown) for holding and pressing the brake pads (not shown) against both faces of the brake disc (not shown). The second brake device (not shown) can be maintained from the opening portion 32c.

Still further, second spacers 34 for adjusting the position of the axis line of the second main spindle (not shown) in the X-axis direction and second heat insulating materials 35 are held between the lower faces of the installation portions 32b of the second housing 32 and the upper face of the second support base 33. The second heat insulating materials 35 are placed on the upper face of the second support base 33, the second spacers 34 are placed on the upper faces of the second heat insulating materials 35, and the installation portions 32b of the second housing 32 are placed on the upper faces of the second spacers 34.

The spacers 21 and 34 to be used have sizes varying depending on the sizes of workpieces held in the chucks 12 and 31 or depending on the shapes of machined workpieces. These can be omitted depending on the requirements of workpieces. In addition, the operations of the drive motor 15, the drive motor (not shown), the chuck cylinder 16, the chuck cylinder (not shown), the drive mechanism 20 and the drive mechanism (not shown) are controlled by the above-mentioned control device (not shown).

Hence, when the drive motor 15 or the drive motor (not shown) of the first headstock 10 or the second headstock 30 is driven by the control device (not shown), the chuck 12 or chuck 31 is rotated around the axis line of the first main spindle 11 or the second main spindle (not shown). Hence, the workpiece (not shown) held in the chuck 12 or the chuck 31 is rotated.

Furthermore, when the drive mechanism 20 of the brake device 17 or the drive mechanism (not shown) of the brake device (not shown) is driven by the control device (not shown), the brake pads 19 or the brake pads (not shown) are pressed against the brake disc 18 or the brake disc (not shown), whereby the rotation of the first main spindle 11 or the second main spindle (not shown) is stopped.

The first saddle 42 has the rectangular accommodation hole 42a and is formed in a cylindrical shape extended in the Y-axis direction, wherein the central portion thereof in the Y-axis direction is supported by the movable frame 41. In addition, the first saddle 42 has a first through hole (not shown) passing through from the upper face to the inner circumferential face of the accommodation hole 42a in the X-axis direction and a second through hole (not shown) passing through from the inner circumferential face of the accommodation hole 42*a* to the lower face in the X-axis direction. These through holes (not shown) are formed coaxially.

The quill 43 is formed in the shape of a rectangular prism extending in the Y-axis direction. The quill 43 has a slit hole (not shown) passing through from the upper face to the lower face in the X-axis direction and aligned with the through holes (not shown) in the first saddle 42 in the vertical direction. The shape of the slit hole (not shown) in the longitudinal direction is formed in the Y-axis direction.

Still further, the quill 43 rotatably supports the first tool rest 44 around the rotation center axis thereof (in the B-axis direction) that is parallel with the Y-axis. A first rotary indexing mechanism (not shown) for rotating the first tool rest 44 in the B-axis direction and indexing the first tool rest 44 at a predetermined rotation angle position under the control of the control device (not shown) is provided inside and on the front side of the quill 43.

A ball screw constituting the second feed device 66 is inserted and passed through the through holes (not shown) in the first saddle 42 and the slit hole (not shown) in the quill 43. Furthermore, the slit hole (not shown) in the quill 43 is formed so that the shape thereof in the longitudinal direction is formed in the Y-axis direction. Hence, the quill 43 can move in the Y-axis direction without interfering with the ball screw.

The first tool rest 44 is provided with a tool spindle 45, which is supported so as to be rotatable around the axis thereof, for holding a tool (not shown). A drive motor (not shown) for rotating the tool spindle 45 around the axis thereof is built in the first tool rest 44. The first tool rest 44 is provided above the axis lines of the first main spindle 11 and the second main spindle (not shown) and configured so as to approach the axis lines from above and move away therefrom upward.

The second tool rest 50 comprises a tool rest body 51 supported on the second saddle 49 so as to be movable in the X-axis direction, a turret 52 supported on the face of the tool rest body 51 on the side of the second headstock 30 so as to be rotatable around the rotation center axis thereof that is parallel with the Z-axis, a tool holder 53, mounted on the turret 52, for holding tools (not shown), and a second rotary indexing mechanism 54 for rotating the turret 52 around the rotation center axis thereof and indexing the tool holder 53 at a predetermined position under the control of the control device (not shown).

The second tool rest 50 is provided below the axis lines of the first main spindle 11 and the second main spindle (not shown) and configured so as to approach the axis lines from below and move away therefrom downward. Furthermore, when the second tool rest 50 is moved to the first headstock 10 in the Z-axis direction, the tool rest body 51 and the second rotary indexing mechanism 54 move into a lower space S formed by the upper portion of the first support base 14 of the first headstock 10 and the first housing 13.

In the NC lathe 1 in accordance with this embodiment configured as described above, when the first feed device 65 is driven by the control device (not shown), the movable frame 41 is moved in the Z-axis direction with respect to the stationary frame 40 under the guidance of the first guide device 60. When the second feed device 66 is driven, the first saddle 42 is moved in the X-axis direction with respect to the movable frame 41 under the guidance of the second guide device 61. When the third feed device (not shown) is driven, the quill 43 is moved in the Y-axis direction with respect to the first saddle 42 under the guidance of the third guide device (not shown). As a result, the first tool rest 44 supported on the front end face of the quill 43 is moved in the orthogonal three-axis directions, that is, the X-axis, Y-axis and Z-axis directions.

In addition, when the fourth feed device 67 is driven by the control device (not shown), the second saddle 49 is moved in the Z-axis direction with respect to the bed 5 under the guidance of the fourth guide device 62. When the fifth feed device 68 is driven, the second tool rest 50 (the tool rest body 51) is moved in the X-axis direction with respect to the second saddle 49 under the guidance of the fifth guide device 63. As a result, the second tool rest 50 is moved in the orthogonal two-axis directions, that is, the X-axis and Z-axis directions.

Furthermore, when the sixth feed device 69 is driven by the control device (not shown), the second headstock 30 is moved in the Z-axis direction with respect to the bed 5 under the guidance of the sixth guide device 64.

Then, the first tool rest 44 and/or the second tool rest 50 are moved in predetermined directions appropriately in a state wherein workpieces held in the first main spindle 11 of the first headstock 10 and/or the second main spindle (not shown) of the second headstock 30 are rotated, whereby the workpieces are machined into predetermined shapes.

As described above, in the NC lathe 1 in accordance with this embodiment, the first headstock 10 comprises the first support base 14 having the concave portion 14*a* on the upper portion thereof, which opens in the upper face and in both end faces in the Z-axis direction, and the first housing 13 for holding the first main spindle 11 and the first drive motor 15 inside the holding hole 13*a*, provided with the installation portions 13*b*, the lower faces of which are aligned with the horizontal plane including the axis line of the first main spindle 11, on both sides of the outer circumferential face in the Y-axis direction, wherein the first housing 13 is supported on the first support base 14 in a state wherein the lower faces of the installation portions 13*b* make contact with the upper face of the first support base 14 and a predetermined clearance is provided between the outer circumferential face thereof and the inner circumferential face of the concave portion 14*a*. The second headstock 30 similarly comprises the second housing 32 and the second support base 33.

Hence, even if heat generated at bearings or the like for supporting the first main spindle 11 and the second main spindle (not shown) is transferred to the first housing 13 and the second housing 32, the housings 13 and 32 can freely expand without any restriction owing to the clearance provided between the outer circumferential faces thereof and the inner circumferential faces of the concave portions 14*a* and 33*a*. In addition, the support portions of the housings 13 and 32 supported by the support bases 14 and 33 are set on the horizontal plane including the axis lines of the first main spindle 11 and the second main spindle (not shown). Hence, even if the housings 13 and 32 expand thermally, the positions of the axis lines of the first main spindle 11 and the second main spindle (not shown) are not changed, whereby the positions are made unchangeable.

Hence, any displacement in the relative positional relationship between the workpiece mounted in the first main spindle 11 and the tool held in the tool rest 44 and any displacement in the relative positional relationship between the workpiece mounted in the second main spindle (not shown) and the tool held in the tool rest 50 owing to the thermal expansion of the housings 13 and 32 can be prevented, whereby the workpieces can be machined at high accuracy.

Furthermore, the first support base 14 of the first headstock 10 is formed so that the upper portion thereof protrudes toward the second tool rest 50 in the Z-axis direction, and configured so that the tool rest body 51 of the second tool rest 50 and the second rotary indexing mechanism 54 can move into and out of the lower space S formed in the upper portion of the first support base 14 and the first housing 13. Hence, the turret 52 can move closer to the first main spindle 11, whereby it is possible to reduce the amount of the protrusion of the first main spindle 11 from the first housing 13 and the amount of the protrusion of the housing 13 from the first support base 14. Hence, the holding rigidity of the first main spindle 11 by the first housing 13 and the supporting rigidity of the first housing 13 by the first support base 14 can be set at appropriately required levels, whereby the workpiece can be machined at high accuracy.

Furthermore, the spacers 21 for adjusting the position of the first main spindle 11 in the X-axis direction are placed between the housing 13 and the support base 14 of the headstock 10, and the spacers 34 for adjusting the position of the second main spindle (not shown) in the X-axis direction are placed between the housing 32 and the support base 33 of the headstock 30. Hence, the positions of the axis lines of the first main spindle 11 and the second main spindle (not shown) in the X-axis direction can be raised upward by the spacers 21 and 34. Therefore, even if the first tool rest 44 cannot be moved downward from above beyond the axis lines of the first main spindle 11 and the second main spindle (not shown) because of the structure of the lathe 1, the first tool rest 44 can be moved downward relatively with respect to the axis lines of the first main spindle 11 and the second main spindle (not shown) by the amounts corresponding to the raised amounts of the axis lines of the first main spindle 11 and the second main spindle (not shown).

Figure 8:
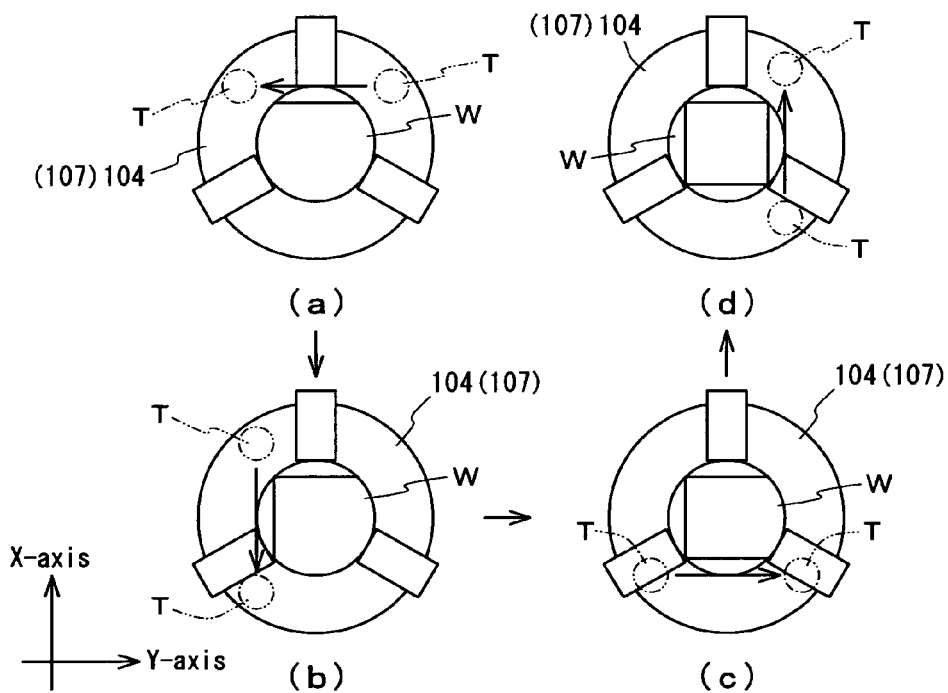
FIG. 8 is an explanatory view for explaining another workpiece machining method.

Hence, for example, in the case when a workpiece is machined into a rectangular shape, the workpiece can be machined into the rectangular shape at high accuracy by moving the first tool rest 44 along straight movement axes as shown in FIG. 8, without indexing the first main spindle 11 and the second main spindle (not shown) at predetermined rotation angle positions around the axis lines thereof.

In addition, the heat insulating materials 22 are held between the housing 13 and the support base 14 of the headstock 10, more specifically, between the lower faces of the spacers 21 and the upper face of the support base 14. Furthermore, the heat insulating materials 35 are held between the housing 32 and the support base 33 of the headstock 30, more specifically, between the lower faces of the spacers 34 and the upper face of the support base 33. The heat insulating materials 22 prevent heat transfer from the housing 13 to the support base 14, and the heat insulating materials 35 prevent heat transfer from the housing 32 to the support base 33, whereby any thermal displacements of the support bases 14 and 33 can be restrained. Therefore, any displacements of the positions of the main spindle 11 and the second main spindle (not shown) owing to the thermal displacements of the support bases 14 and 33 can be prevented, whereby workpieces can be machined at high accuracy.

An embodiment in accordance with the present invention has been explained above. However, specific embodiments capable of being attained by the present invention are not limited to this.

In the above-mentioned embodiment, the NC lathe 1 provided with two headstocks, that is, the first and second headstocks 10 and 30, has been taken as an example and explained. However, the present invention is not limited to this embodiment. The present invention can preferably be applied to even an NC lathe provided with only the first headstock 10.

What is claimed is:

1. A lathe comprising at least:

a bed formed so that the front face thereof is vertical; a headstock provided on said bed; a main spindle provided horizontally so that the axis line thereof is parallel with the front face of said bed and supported by said headstock so as to be rotatable around the axis line thereof; a rotation drive device for rotating said main spindle around the axis line thereof; a first tool rest provided on the upper face of said bed so as to be movable in orthogonal three-axes directions, that is, the direction of a first axis along the axis line of said main spindle, the direction of a second axis along the vertical direction and the direction of a third axis orthogonal to both of said first axis and said second axis; and a second tool rest provided on the front face of said bed so as to be movable in orthogonal two-axes directions, that is, the direction of said first axis and the direction of said second axis, comprising a tool rest body supported on the front face of said bed so as to be movable in said orthogonal two-axes directions, a turret supported on a face of said tool rest body, opposite to the side thereof on the side of said headstock in said first-axis direction, so as to be rotatable around the rotation center axis thereof that is parallel with said first axis, and a rotary indexing device for rotating said turret around said rotation center axis thereof and for indexing said turret at a predetermined rotation angle position, the first tool rest being provided above the axis line of said main spindle and configured so as to approach the axis line of said main spindle from above and move away therefrom upward, and said second tool rest being provided below the axis line of said main spindle and configured so as to approach the axis line of said main spindle from below and move away therefrom downward, wherein said headstock comprises a housing, having a holding hole, for holding at least said main spindle and said rotation drive device in said holding hole, and a support base, fixed to said bed, for supporting said housing, said support base has a concave portion on the upper portion thereof, which opens in the upper face and in both end faces in said first-axis direction, the upper portion of said support base protrudes toward said second tool rest in said first-axis direction, and a predetermined space is formed downward therefrom, said housing has installation portions protruding to both sides of the outer circumferential face thereof in said third-axis direction, the lower faces of which are positioned in a horizontal plane including the axis line of said main spindle, and said housing is supported on said support base in a state wherein the lower faces of said installation portions make contact with the upper face of said support base and a predetermined clearance is provided between the outer circumferential face thereof and the inner circumferential face of said concave portion, and at least said tool rest body of said second tool rest is configured so as to be movable into and out of said space formed downward from the upper portion of said support base.

2. A lathe in accordance with claim 1, wherein said headstock is further provided with heat insulating materials held between the lower faces of said installation portions of said housing and the upper face of said support base.

3. A lathe in accordance with claim 1, wherein said headstock is further provided with spacers for adjusting the position of the axis line of said main spindle in said second-axis direction, and the lower faces of said installation portions of said housing are placed on the upper face of said support base via said spacers.

4. A lathe in accordance with claim 3, wherein said headstock is further provided with heat insulating materials held between the lower faces of said installation portions of said housing and said spacers or between the upper face of said support base and said spacers.

* * * * *